United States Patent
Meng

(10) Patent No.: US 10,179,873 B1
(45) Date of Patent: Jan. 15, 2019

(54) WATER SWELLABLE RUBBER COMPOSITION SUITABLE FOR USE WITH OIL FIELD EQUIPMENT

(71) Applicant: Weir Slurry Group, Inc., Madison, WI (US)

(72) Inventor: Tham Meng, Salt Lake City, UT (US)

(73) Assignee: Weir Slurry Group, Inc., Madison, WI (US)

( * ) Notice: Subject to any disclaimer, the term of this patent is extended or adjusted under 35 U.S.C. 154(b) by 0 days.

(21) Appl. No.: 14/641,008

(22) Filed: Mar. 6, 2015

Related U.S. Application Data

(60) Provisional application No. 61/949,207, filed on Mar. 6, 2014.

(51) Int. Cl.
*C09K 8/42* (2006.01)
*C09K 8/467* (2006.01)

(52) U.S. Cl.
CPC .............. *C09K 8/42* (2013.01); *C09K 8/467* (2013.01)

(58) Field of Classification Search
CPC ...... C09K 2200/0617; C09K 2200/062; C09K 2200/0635; C09K 8/426; C09K 8/518; C09K 2003/1046; C09K 2200/0208; C09K 2200/0269; C09K 2200/0607; C09K 2208/08; C09K 8/44; C09K 8/467; C09K 8/50; C09K 3/10; C09K 8/5083; C09K 2200/0625; C09K 2003/104; C09K 8/42; C09K 8/487; C09K 8/516; C09K 2200/06; E21B 43/10; E21B 43/108; E21B 43/14; E21B 43/2401; E21B 43/2406; E21B 43/267; E21B 33/1208; E21B 43/08; E21B 33/134; E21B 23/01; E21B 23/06; E21B 33/138; E21B 43/103; E21B 33/13; E21B 33/16; E21B 47/01; E21B 21/003; E21B 33/1216; E21B 33/128; E21B 33/136
See application file for complete search history.

(56) References Cited

U.S. PATENT DOCUMENTS

| | | | | |
|---|---|---|---|---|
| 5,476,718 | A * | 12/1995 | Ichizuka | C09K 3/10 405/267 |
| 6,206,364 | B1 * | 3/2001 | Brinkman | B65H 5/026 271/193 |
| 6,358,580 | B1 * | 3/2002 | Mang | C08L 21/00 428/304.4 |
| 2009/0084550 | A1 * | 4/2009 | Korte | C08L 1/02 166/294 |
| 2013/0096038 | A1 * | 4/2013 | Kim | C08L 23/16 507/221 |
| 2013/0269787 | A1 * | 10/2013 | Choi | B01J 20/264 137/2 |

FOREIGN PATENT DOCUMENTS

SU 767145 * 9/1980

OTHER PUBLICATIONS http://www.merriam-webster.com/dictionary/e.g. downloaded on Jul. 5, 2016.*
SU 767145 english translation.*
http://www.merriam-webster.com/dictionary/e.g. downloaded on Jul. 5, 2016.*
C. Su et al, Effects of phenolic oligomer on the dynamic mechanical properties of nitrile butadiene rubber, Advanced Material Research, 2011, vol. 335-336, pp. 120-123.*

* cited by examiner

*Primary Examiner* — Kumar R Bhushan
(74) *Attorney, Agent, or Firm* — Baker & McKenzie LLP

(57) ABSTRACT

A swellable packer comprising a metallic pipe, and a swellable rubber composition comprising an elastomer, a water soluble resin, for example polyethylene oxide, an ionic peroxide cure and/or peroxide curing with a metallic co-agent, a salt, and a super absorbing polymer wrapped around at least a portion of the metallic pipe.

18 Claims, 1 Drawing Sheet

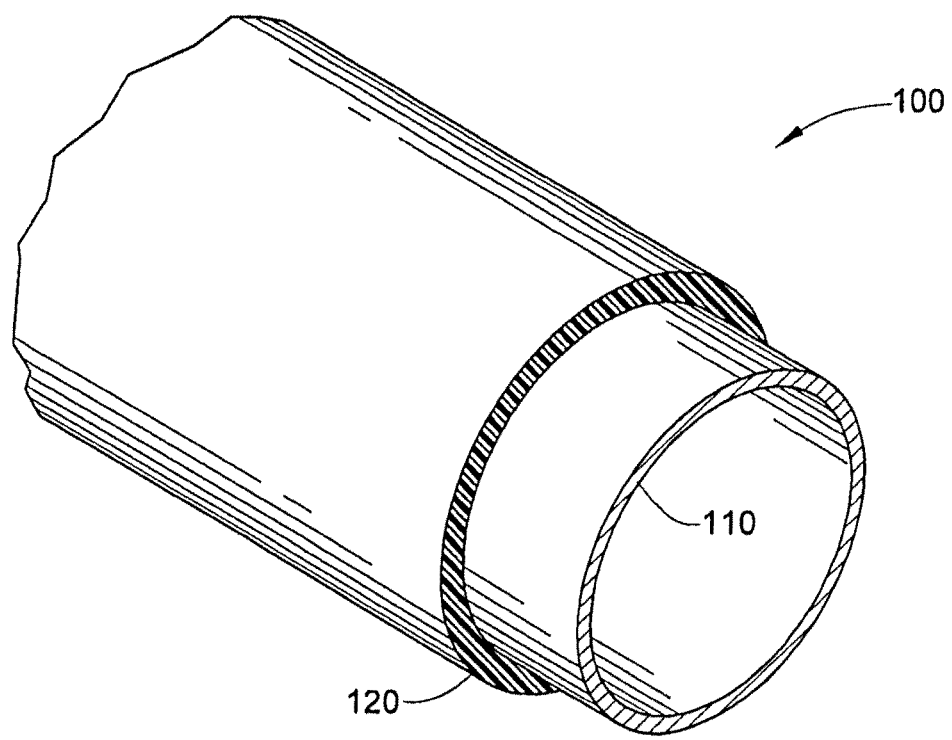

WATER SWELLABLE RUBBER COMPOSITION SUITABLE FOR USE WITH OIL FIELD EQUIPMENT

CROSS REFERENCE TO RELATED APPLICATION

This application claims priority to U.S. Provisional Application No. 61/949,207, filed Mar. 6, 2014, and which is incorporated herein by reference in its entirety.

FIELD OF THE DISCLOSURE

The present disclosure relates to a water swellable rubber composition and more particularly, to a water swellable rubber composition for use with oil and gas field equipment including, for example, swellable packers. The present disclosure also relates to systems and methods for sealing a region between the wellbore wall and the packer-conduit assembly, wherein the earth formation contains water, water based fluid and/or formation water susceptible of flowing into the wellbore.

BACKGROUND OF THE DISCLOSURE

Conventionally, well conduits were cemented into place in the wellbore. However, the use of cement is sometimes not desirable because it may reduce or interfere with the production of the well. With the introduction of non-cemented wells open hole packers came into use. Initially, the packer designs were mechanical in nature and eventually, swellable packers were introduced.

Swellable packers were initially designed to swell when exposed to oil based fluids. More recently swellable packers which swell in the presence of water based fluids (e.g., brine) are also in use and offer. However, these water swellable packers have drawbacks because the rubber composition is not always acceptable for use in wells and/or the rubber does not sufficiently swell when it contacts saline formation water.

Accordingly, it is desirable to have a water swellable rubber which is more acceptable for use with oil and gas field equipment including, for example, swellable packers.

SUMMARY OF THE DISCLOSURE

Exemplary embodiments described herein may provide for a water swellable rubber composition comprising: an elastomer; a water soluble resin, for example polyethylene oxide; an ionic peroxide cure and/or peroxide curing with a co-agent; a salt; and a super absorbing polymer.

Exemplary embodiments described herein may provide for a water swellable rubber composition comprising: about 100 parts per hundred (PHR) of an elastomer; about 40 PHR of a water soluble resin, for example polyethylene oxide; about 10 or 20 PHR of ionic peroxide cure and/or peroxide curing with a co-agent; about 126 PHR of a salt; and about 65 PHR of a super absorbing polymer, clay and/or other natural swelling material.

In exemplary embodiments, the elastomer may be one or more combinations of butadiene acrylonitrile copolymer, nitrile rubber, NBR, hydrogenated NBR, highly saturated nitrile, HNR, HNBR, carboxylated NBR (XNBR), CR, EPDM, ACM, NR, SBR, BR, butyl rubbers (IIR) CSM, Silicone, fluoro rubbers, and perfluoro rubbers, tetrafluoro ethylene propylene rubber).

In exemplary embodiments, the co-agent used for peroxide curing may be zinc diacrylate or other metallic coagents.

In exemplary embodiments, the salt may be one or more combinations of metal containing salts, such as metal chlorides (e.g., sodium chloride, potassium chloride, or calcium chloride), metal phosphates (e.g., $Ca_3(PO_4)_2$), metal carbonates (e.g., $CaCO_3$ or $BaCO_3$), metal oxides (e.g., MgO), metal sulfides (e.g., ZnS), metal hydroxides (e.g., $Fe(OH)_2$), metal sulfates (e.g., $BaSO_4$), metal acetates, metal bicarbonates, metal formates, metal hydrosulphides, metal imides, metal nitrates, metal nitrides; dissociating salts; and nonmetal salts (e.g., $NH_4Cl$).

In exemplary embodiments, the super absorbant polymer, clays, and/or natural swelling materials may comprise one or more combinations of poly-electrolytes, polyacrylates (e.g., sodium polyacrylate), polyacryamide-co-polyacrylates (e.g., polyacryamide-co-potassium acrylate), polyacrylamides (e.g., potassium polyacrylamide), acrylic acids, hydrophilic clays, bentonite (e.g., sodium bentonite, potassium bentonite, calcium bentonite, or wyoming bentonite), wood, cork, and/or cellulose fibres.

In exemplary embodiments, the water swellable rubber composition may further comprise a general purpose plasticiser for rubber products, such as phthalate esters (e.g., dioctyl phthalate), trimellitates, sebacates, adipates, terephthalates, benzoates, dibenzoates, organophosphates, gluterates, or azelates.

In exemplary embodiments, the water swellable rubber composition may further comprise carbon black.

In exemplary embodiments, the water swellable rubber composition may further comprise zinc oxide.

In exemplary embodiments, the water swellable rubber composition may further comprise polyethylene glycol.

In exemplary embodiments, the water swellable rubber composition may further comprise a cement or Portland cement.

In exemplary embodiments, the water swellable rubber composition may further comprise about 35 PHR of a cement of Portland cement.

In exemplary embodiments, the water swellable rubber composition may further comprise silica.

In exemplary embodiments, the water swellable rubber composition may further comprise about 30 PHR of silica.

In exemplary embodiments, the water swellable rubber composition may further comprise about 8-12 PHR of dioctyl phthalate.

In exemplary embodiments, the water swellable rubber composition may further comprise about 10 PHR of dioctyl phthalate.

In exemplary embodiments, the water swellable rubber composition may further comprise about 6-10 PHR of carbon black.

In exemplary embodiments, the water swellable rubber composition may further comprise about 8 PHR of carbon black.

In exemplary embodiments, the water swellable rubber composition may further comprise about 3-7 PHR of zinc oxide.

In exemplary embodiments, the water swellable rubber composition may further comprise about 5 PHR of zinc oxide.

In exemplary embodiments, the water swellable rubber composition may further comprise stearic acid.

In exemplary embodiments, the water swellable rubber composition may further comprise about 1 PHR of stearic acid.

In exemplary embodiments, the water swellable rubber composition may further comprise about 8-12 PHR of polyethylene glycol.

In exemplary embodiments, the water swellable rubber composition may further comprise about 10 PHR of polyethylene glycol.

Exemplary embodiments described herein may provide for a water swellable rubber composition comprising: a nitrile elastomer; dioctyl phthalate (DOP); carbon black; silica; zinc oxide; stearic acid; polyethylene glycol; a salt; super absorbent polymer; polyethylene oxide; magnesium oxide; a crosslinker; and a co-agent for peroxide curing.

In exemplary embodiments, the nitrile elastomer may be Nipol DN4050.

In exemplary embodiments, the carbon black may be N-550.

In exemplary embodiments, the silica may be Ultrasil 7000 GR.

In exemplary embodiments, the polyethylene glycol is PEG6000.

In exemplary embodiments, the salt may be Microzo and/or a microsized extra fine salt e.g., by Cargill.

In exemplary embodiments, the super absorbent polymer may be AquaKeep 10SH-NF.

In exemplary embodiments, the magnesium oxide may be Maglite Y.

In exemplary embodiments, the crosslinker may be DiCup 40KE.

In exemplary embodiments, the metallic co-agent for peroxide curing may be Dymalink 633.

In exemplary embodiments, the water swellable rubber composition may further comprise about 80-120 (e.g., 80, 90, 100, 110 or 120) PHR of nitrile elastomer.

In exemplary embodiments, the water swellable rubber composition may further comprise about 5-30 (e.g., 5, 7, 9, 10, 11, 13, 15, 20, 25 or 30) PHR of dioctyl phthalate.

In exemplary embodiments, the water swellable rubber composition may further comprise about 1-30 (e.g., 1, 2, 3, 4, 5, 8, 10, 12, 15, 20, 25 or 30) PHR of carbon black.

In exemplary embodiments, the water swellable rubber composition may further comprise about 5-60 (e.g., 5, 10, 15, 20, 25, 30, 35, 40, 45, 50, 55 or 60) PHR of silica.

In exemplary embodiments, the water swellable rubber composition may further comprise about 2-10 (e.g., 2, 3, 4, 5, 6, 7, 8, 9 or 10) PHR of zinc oxide.

In exemplary embodiments, the water swellable rubber composition may further comprise about 0.1-5 (e.g., 0.1, 0.5, 1, 2, 3, 4 or 5) PHR of stearic acid.

In exemplary embodiments, the water swellable rubber composition may further comprise about 5-50 (e.g., 5, 7, 8, 10, 11, 12, 13, 15, 20, 25, 30, 35, 40, 45 or 50) PHR of polyethylene glycol.

In exemplary embodiments, the water swellable rubber composition may further comprise about 10-140 (e.g., 10, 20, 30, 40, 50, 60, 70, 80, 90, 100, 110, 120, 122, 123, 124, 145, 126, 127, 128, 129, 130, 135 or 140) PHR of salt.

In exemplary embodiments, the water swellable rubber composition may further comprise about 50-70 (e.g., 50, 55, 60, 65 or 70) PHR of super absorbent polymer.

In exemplary embodiments, the water swellable rubber composition may further comprise about 20-90 (e.g., 20, 25, 30, 35, 40, 45, 50, 55, 60, 65, 70, 75, 80, 85 or 90) PHR of polyethylene oxide.

In exemplary embodiments, the water swellable rubber composition may further comprise about 1-20 (e.g., 1, 2, 3, 4, 5, 6, 7, 8, 9, 10, 12, 14, 16, 18 or 20) PHR of magnesium oxide.

In exemplary embodiments, the water swellable rubber composition may further comprise about 1-10—(e.g., 1, 2, 3, 4, 5, 6, 7, 8, 9 or 10) PHR of crosslinker.

In exemplary embodiments, the water swellable rubber composition may further comprise about 1-10 (e.g., 1, 2, 3, 4, 5, 6, 7, 8, 9 or 10) PHR of metallic co-agent for peroxide curing.

Exemplary embodiments described herein may provide for a water swellable rubber composition comprising: a nitrile elastomer; a natural rubber; dioctyl phthalate; carbon black; silica; zinc oxide; stearic acid; super absorbent polymer; polyethylene oxide; polyethylene glycol; CBS; and a vulcanizing agent.

In exemplary embodiments, the nitrile elastomer may be Nipol DN4050.

In exemplary embodiments, the carbon black may be N-550.

In exemplary embodiments, the silica may be Ultrasil 7000 GR.

In exemplary embodiments, the super absorbent polymer may be AquaKeep 10SH-NF.

In exemplary embodiments, the polyethylene glycol may be PEG6000.

In exemplary embodiments, the vulcanizing Agent may be Crystex Sulpher HS.

In exemplary embodiments, the water swellable rubber composition may further comprise about 60-90 (e.g., 60, 65, 70, 75, 80, 85 or 90) PHR of nitrile elastomer.

In exemplary embodiments, the water swellable rubber composition may further comprise about 20-30 (e.g., 20, 25 or 30) PHR of natural rubber.

In exemplary embodiments, the water swellable rubber composition may further comprise about 5-15 (e.g., 5, 6, 7, 8, 9, 10, 11, 12, 13, 14 or 15) PHR of dioctyl phthalate.

In exemplary embodiments, the water swellable rubber composition may further comprise about 5-15 (e.g., 5, 6, 7, 8, 9, 10, 11, 12, 13, 14 or 15) PHR of carbon black.

In exemplary embodiments, the water swellable rubber composition may further comprise about 20-40 (e.g., 20, 25, 30, 35 or 40) PHR of silica.

In exemplary embodiments, the water swellable rubber composition may further comprise about 1-10 (e.g., 1, 2, 3, 4, 5, 6, 7, 8, 9, 10, 11, 12, 13, 14 or 15) PHR of zinc oxide.

In exemplary embodiments, the water swellable rubber composition may further comprise about 0.1-5 (e.g., 0.1, 0.5, 1, 2, 3, 4 or 5) PHR of stearic acid.

In exemplary embodiments, the water swellable rubber composition may further comprise about 30-50 (e.g., 30, 35, 40, 45 or 50) PHR of super absorbent polymer.

In exemplary embodiments, the water swellable rubber composition may further comprise about 20-30 (e.g., 20, 25 or 30) PHR of polyethylene oxide.

In exemplary embodiments, the water swellable rubber composition may further comprise about 5-15 (e.g., 5, 6, 7, 8, 9, 10, 11, 12, 13, 14 or 15) PHR of polyethylene glycol.

In exemplary embodiments, the water swellable rubber composition may further comprise about 0.1-5 (e.g., 0.1, 0.5, 1, 2, 3, 4 or 5) PHR of CBS.

In exemplary embodiments, the water swellable rubber composition may further comprise about 0.1-5 (e.g., 0.1, 0.5, 1, 2, 3, 4 or 5) PHR of vulcanizing agent.

Exemplary embodiments described herein may provide for a water swellable rubber composition comprising: a nitrile elastomer; carbon black; silica; polyethylene glycol; stearic acid; dioctyl phthalate; polyethylene oxide; magnesium oxide; a crosslinker; zinc oxide; and a super absorbent polymer.

In exemplary embodiments, the nitrile elastomer may be Nipol DN4050.

In exemplary embodiments, the carbon black may be N-550.

In exemplary embodiments, the silica may be Ultrasil 7000 GR.

In exemplary embodiments, the polyethylene glycol may be PEG6000.

In exemplary embodiments, the magnesium oxide may be Maglite Y.

In exemplary embodiments, the crosslinker may be DiCup 40KE.

In exemplary embodiments, the super absorbent polymer may be Abtech 3005-63.

In exemplary embodiments, the water swellable rubber composition may further comprise about 100 PHR of nitrile elastomer.

In exemplary embodiments, the water swellable rubber composition may further comprise about 1-30 (e.g., 1, 2, 3, 4, 5, 6, 7, 8, 9, 10, 11, 12, 13, 14, 15, 20, 25 or 30) PHR of carbon black.

In exemplary embodiments, the water swellable rubber composition may further comprise about 5-50 (e.g., 5, 10, 15, 20, 25, 30, 35, 40, 45 or 50) PHR of silica.

In exemplary embodiments, the water swellable rubber composition may further comprise about 5-50 (e.g., 5, 10, 15, 20, 25, 30, 35, 40, 45 or 50) PHR of polyethylene glycol.

In exemplary embodiments, the water swellable rubber composition may further comprise about 0.1-5 (e.g., 0.1, 0.5, 1, 2, 3, 4 or 5) PHR of stearic acid.

In exemplary embodiments, the water swellable rubber composition may further comprise about 5-30 (e.g., 5, 10, 15, 20, 25 or 30) PHR of dioctyl phthalate.

In exemplary embodiments, the water swellable rubber composition may further comprise about 30-90 (e.g., 30, 35, 40, 45, 50, 55, 60, 65, 70, 75, 80, 85 or 90) PHR of polyethylene oxide.

In exemplary embodiments, the water swellable rubber composition may further comprise about 1-20 (e.g., 1, 2, 3, 4, 5, 6, 7, 8, 9, 10, 11, 12, 13, 14, 15, or 20) PHR of magnesium oxide.

In exemplary embodiments, the water swellable rubber composition may further comprise about 1-15 (e.g., 1, 2, 3, 4, 5, 6, 7, 8, 9, 10, 11, 12, 13, 14 or 15) PHR of crosslinker.

In exemplary embodiments, the water swellable rubber composition may further comprise about 1-15 (e.g., 1, 2, 3, 4, 5, 6, 7, 8, 9, 10, 11, 12, 13, 14 or 15) PHR of zinc oxide.

In exemplary embodiments, the water swellable rubber composition may further comprise about 40-140 (e.g., 40, 50, 55, 60, 65, 70, 75, 80, 90, 100, 110, 120, 130 or 140) PHR of super absorbent polymer.

Exemplary embodiments described herein may provide for a water swellable rubber composition as described herein wherein the water swellable rubber may be configured to swell by at least about 10%, 20%, 30%, 40%, 50%, 60%, 70%, 80%, 90%, 100%, 110%, 120%, 130%, 140%, 150%, 160%, 170%, 180%, 190%, 200%, 210%, 220%, 230%, 240% or 250%.

Exemplary embodiments described herein may provide for a water swellable rubber composition as described herein wherein the water swellable rubber may be configured to swell by at least about 10%, 20%, 30%, 40%, 50%, 60%, 70%, 80%, 90%, 100%, 110%, 120%, 130%, 140%, 150%, 160%, 170%, 180%, 190%, 200%, 210%, 220%, 230%, 240% or 250% in about 5% brine solution.

Exemplary embodiments described herein may provide for a water swellable rubber composition as described herein wherein the water swellable rubber may be configured to swell by at least about 10%, 20%, 30%, 40%, 50%, 60%, 70%, 80%, 90%, 100%, 110%, 120%, 130%, 140%, 150%, 160%, 170%, 180%, 190%, 200%, 210%, 220%, 230%, 240% or 250% in about 10% brine solution.

Exemplary embodiments described herein may provide for a water swellable rubber composition as described herein wherein the water swellable rubber may be configured to swell by at least about 10%, 20%, 30%, 40%, 50%, 60%, 70%, 80%, 90%, 100%, 110%, 120%, 130%, 140%, 150%, 160%, 170%, 180%, 190%, 200%, 210%, 220%, 230%, 240% or 250% in about 15% brine solution.

Exemplary embodiments described herein may provide for a water swellable rubber composition as described herein wherein the water swellable rubber may be configured to swell by at least about 10%, 20%, 30%, 40%, 50%, 60%, 70%, 80%, 90%, 100%, 110%, 120%, 130%, 140%, 150%, 160%, 170%, 180%, 190%, 200%, 210%, 220%, 230%, 240% or 250% in about 20% brine solution.

Exemplary embodiments described herein may provide for a water swellable rubber composition as described herein wherein the water swellable rubber may be configured to swell by at least about 10%, 20%, 30%, 40%, 50%, 60%, 70%, 80%, 90%, 100%, 110%, 120%, 130%, 140%, 150%, 160%, 170%, 180%, 190%, 200%, 210%, 220%, 230%, 240% or 250% in about 25% brine solution.

Exemplary embodiments described herein may provide for a water swellable rubber composition as described herein wherein the water swellable rubber does not significantly swell in the presence of oil based fluids.

Exemplary embodiments described herein may provide for a swellable packer assembly comprising: a conduit, and a sweallable rubber composition as described herein wrapped around at least a portion of the conduit.

Other aspects, features, and advantages will become apparent from the following detailed description when taken in conjunction with the accompanying drawings, which are a part of this disclosure and which illustrate, by way of example, principles of inventions disclosed.

DETAILED DESCRIPTION OF THE DRAWINGS

Notwithstanding any other forms which may fall within the scope of the disclosure as set forth in the Summary, specific embodiments will now be described by way of example and with reference to the accompanying drawings in which:

FIG. 1 illustrates an exemplary embodiment of sectional view of a swellable packer assembly comprising a rubber coating which is capable of swelling in the presence of water and/or water formations and the rubber coating surrounds a conduit.

DETAILED DESCRIPTION OF EXEMPLARY EMBODIMENTS

FIG. 1 illustrates an exemplary embodiment of a sectional view of a swellable packer assembly comprising a rubber coating which is capable of swelling in the presence of water and/or water formations. As shown, the swellable packer assembly 100 comprises a conduit 110 with a swellable rubber 120 wrapped around the conduit 110. In exemplary embodiments, the conduit may be made of a suitable metal. In exemplary embodiments, the rubber 120 may be vulcanized to the conduit 110 such that the combination has a substantially unitary construction. In exemplary embodiments, the swellable packer assembly may be designed to reduce and/or minimize extrusion of the rubber during use. In exemplary embodiments, end rings (not shown) may be provided to protect the ends of the rubber 120 or alternatively, the end portions of the rubber 120 may be tapered (not shown) to more easily move through the well to the desired depth.

In exemplary embodiments, the water swellable rubber may comprise an elastomer such as a thermoset elastomer capable of withstanding high temperatures for a prolonged period of time and/or that does not swell, or swells insubstantially, in the presence of an oil and/or hydrocarbon based fluid but does swell in the presence of a water based fluid. As used herein, for example, the elastomer may be one or more of the following: butadiene acrylonitrile copolymer, nitrile rubber, NBR, hydrogenated NBR, highly saturated nitrile, HNR, HNBR, carboxylated NBR (XNBR), CR, EPDM, ACM, NR, SBR, BR, butyl rubbers (IIR) CSM, Silicone, fluoro rubbers, perfluoro rubbers, tetrafluoro ethylene propylene rubber (FEPM) or combinations thereof.

In exemplary embodiments, the swellable rubber may also comprise a cement or portland cement or one or more reactive filler materials selected from the group consisting of a cement, cementitious material, metal oxide, and mixtures thereof which react and swell upon contact with water and/or stiffen the rubber composite. In exemplary embodiments, the cement may result in improvements in the physical properties of the rubber such as increased volume and increased modulus. For example, the filler may be a reactive filler, a reinforcing reactive filler, a sealing system, cement clinker, silicate, aluminate, ferrite or combinations thereof.

In exemplary embodiments, the water swellable rubber may comprise a water soluble resin, for example polyethylene oxide, which increases the swelling rate and the degree of swell of the elastomer. Other water soluble resins which may be used comprise carboxymethyl cellulose, polyvinyl pyrrolidone, hydroxyethyl cellulose, and/or hydroxypropyl cellulose.

In exemplary embodiments, the water swellable rubber may comprise an ionic peroxide curing agent and/or a peroxide curing agent with a co-agent. For example, in exemplary embodiments, the peroxide may be used to vulcanize and crosslink saturated polymers. In particular, the peroxide may undergo homolytic cleavage to form two alkoxy radicals (vulcanizing agent). The alkoxy radical may abstract a hydrogen atom from a polymer chain (ionic crosslinking system) and two radicals on adjacent polymer chains may couple to form a carbon-carbon bond (co-crosslinking system such as metal containing poly-functional organic compounds). In exemplary embodiments, the metallic co-agent used for peroxide curing may be zinc diacrylate.

In exemplary embodiments, the water swellable rubber may comprise silica (or other filler particles) to reinforce the rubber compound by restricting the mobility of the polymer chains. This reinforcement is generally described as an amount of resistance to deformation that is contributed by the filler.

In exemplary embodiments, the water swellable rubber may comprise a salt, for example particles of salt, such as fine particles of salt, which are incorporated into the water swellable rubber to allow migration of water, water based fluids, salt-containing water based fluids, and/or water formations, such as brines, into the swellable rubber by osmosis so as to introduce swelling of the swellable rubber upon migration of the water, water based fluids, salt-containing water based fluids, and/or water formations into the swellable rubber. Examples of salt may comprise one or more of the following metal containing salts, such as metal chlorides (e.g., sodium chloride, potassium chloride, or calcium chloride), metal phosphates (e.g., $Ca_3(PO_4)_2$), metal carbonates (e.g., $CaCO_3$ or $BaCO_3$), metal oxides (e.g., MgO), metal sulfides (e.g., ZnS), metal hydroxides (e.g., $Fe(OH)_2$), metal sulfates (e.g., $BaSO_4$), metal acetates, metal bicarbonates, metal formates, metal hydrosulphides, metal imides, metal nitrates, metal nitrides; dissociating salts; and non-metal salts (e.g., $NH_4Cl$).

In exemplary embodiments, the water swellable rubber may comprise a material that swells when it comes in contact with water or water formations (e.g., a super absorbant polymer, clays, and/or natural swelling materials). For example, such a material may comprise any combination of poly-electrolytes, polyacrylates (e.g., sodium polyacrylate), polyacryamide-co-polyacrylates (e.g., polyacryamide-co-potassium acrylate), polyacrylamides (e.g., potassium polyacrylamide), acrylic acids, hydrophilic clays, bentonite (e.g., sodium bentonite, potassium bentonite, calcium bentonite, or wyoming bentonite), wood, cork, and/or cellulose fibres.

In exemplary embodiments, the water swellable rubber may comprise a general purpose plasticiser for rubber products, such as phthalate esters (e.g., dioctyl phthalate), trimellitates, sebacates, adipates, terephthalates, benzoates, dibenzoates, organophosphates, gluterates, or azelates.

In exemplary embodiments, the water swellable rubber may comprise a material to reinforce a rubber compound to improve physical properties and/or color the product such as pigments or carbon black (N-550).

In exemplary embodiments, the water swellable rubber may comprise a material that reacts with the filler particles and acts as an activator in the cure system, such as zinc oxide. Together with the zinc oxide the rubber may further comprise stearic acid to react which react to produce zinc stearate, an intermediate in the vulcanisation mechanism.

In exemplary embodiments, the water swellable rubber may comprise a water-soluble, waxy solid for use as a process aid and lubricant during the rubber mixing process such as polyethylene glycol.

In exemplary embodiments, the water swellable rubber may comprise about 100 parts per hundred rubber (PHR) (i.e., the compositions comprise about 100 parts of an elastomer or combinations of elastomers) of an elastomer, about 40 PHR of polyethylene oxide, about 20 PHR of ionic peroxide cure and/or peroxide curing with a co-agent, about 126 PHR of a salt, and about 65 PHR of a super absorbing polymer, clay and/or other natural swelling material. In exemplary embodiments, the water swellable rubber may further comprise any combination of one or more of: about 35 PHR of a cement or Portland cement, about 30 FUR of silica, about 10 PHR of dioctyl phthalate, about 8 PHR of N-550 (carbon black), about 5 PHR of zinc oxide, about 1 FUR of stearic acid, and/or about 10 PHR of PEG6000 (polyethylene glycol).

In exemplary embodiments, the water swellable rubber may comprise the following composition:

| Material Description | PHR |
|---|---|
| Nitrile Elastomer (e.g., Nipol DN4050) | 80-120 (e.g., 100) |
| Dioctyl phthalate (DOP) | 5-30 (e.g., 10) |
| N-550 (carbon black) | 1-30 (e.g., 8) |
| Silica (e.g., Ultrasil 7000 GR) | 5-50 (e.g., 30) |
| Zinc oxide | 2-10 (e.g., 5) |
| Stearic Acid | 0.1-5 (e.g., 1) |
| Polyethylene glycol (e.g., PEG6000) | 5-50 (e.g., 10) |
| Salt (e.g., Microzo) | 10-140 (e.g., 126) |

-continued

| Material Description | PHR |
|---|---|
| Super absorbent polymer (e.g., AquaKeep 10SH-NF) | 40-140 (e.g., 60) |
| Polyethylene Oxide (PEO-3) | 20-90 (e.g., 40) |
| Magnesium Oxide (e.g., Maglite Y) | 1-20 (e.g., 4) |
| Crosslinker (e.g., DiCup 40KE) | 1-10- (e.g., 5) |
| Co-agent for peroxide curing (e.g., Dymalink 633) | 1-10 (e.g., 5) |

In exemplary embodiments, the water swellable rubber may comprise the following composition:

| Material Description | PHR |
|---|---|
| Nitrile Elastomer (e.g., Nipol DN4050) | 60-90 (e.g., 75) |
| Natural rubber (NR) | 20-30 (e.g., 25) |
| Dioctyl phthalate (DOP) | 5-15 (e.g., 10) |
| N-550 (carbon black) | 5-15 (e.g., 8) |
| Silica (e.g., Ultrasil 7000 GR) | 20-40 (e.g., 30) |
| Zinc oxide | 1-10 (e.g., 5) |
| Stearic Acid | 0.1-5 (e.g., 1) |
| Super absorbent polymer (e.g., AquaKeep 10SH-NF) | 30-50 (e.g., 40) |
| Polyethylene Oxide (PEO-3) | 20-30 (e.g., 25) |
| Polyethylene glycol (e.g., PEG6000) | 5-15 (e.g., 10) |
| CBS | 0.1-5 (e.g., 1) |
| Vulcanizing Agent (e.g., Crystex Sulpher HS) | 0.1-5 (e.g., 1.5) |

In exemplary embodiments, the ater swellable rubber may comprise the following composition:

| Material Description | PHR |
|---|---|
| Nitrile Elastomer (e.g., Nipol DN4050 | 80-120 (e.g., 100) |
| N-550 (carbon black) | 1-30 (e.g., 8) |
| Silica (e.g., Ultrasil 7000 GR) | 5-50 (e.g., 30) |
| Polyethylene glycol (e.g.. PEG6000) | 5-50 (e.g., 10) |
| Stearic Acid | 0.1-5 (e.g., 1) |
| Dioctyl phthalate (DOP) | 5-30 (e.g., 10) |
| Polyethylene Oxide (PEO-3) | 20-90 (e.g., 40) |
| Magnesium Oxide (e.g., Maglite Y) | 1-20 (e.g., 4) |
| Crosslinker (e.g., DiCup 40KE) | 1-15 (e.g., 5) |
| Zinc oxide | 1-15 (e.g., 5) |
| Super absorbent polymer (e.g., Abtech 3005-63) | 40-140 (e.g., 65) |

In exemplary embodiments, a water swellable rubber composition as described herein may be configured to swell by at least about 50%, 60%, 70%, 80%, 90%, 100%, 110%, 120%, 130%, 140%, 150%, 160%, 170%, 180%, 190%, 200%, 210%, 220%, 230%, 240% or 250% in brine solution, for example a 3-30% brine solution, such as 5%, 10%, 15%, 20%, 25% or 30% brine. The brine solution may comprise water with dissolved alkali metal salts (e.g., NaCl or KCl) and/or alkaline-earth metal salts (e.g., CaCl$_2$, CaCO$_3$, or MgCl$_2$).

While exemplary embodiments have been shown and described herein, it will be obvious to those skilled in the art that such embodiments are provided by way of example only. It is intended that the following claims define the scope of the invention and that methods and structures within the scope of these claims and their equivalents be covered thereby.

In the foregoing description of exemplary embodiments, specific terminology has been resorted to for the sake of clarity. However, the invention is not intended to be limited to the specific terms so selected, and it is to be understood that each specific term includes all technical equivalents which operate in a similar manner to accomplish a similar technical purpose. Terms such as "front" and "rear", "inner" and "outer", "above", "below", "upper" and "lower" and the like are used as words of convenience to provide reference points and are not to be construed as limiting terms.

The reference in this specification to any prior publication (or information derived from it), or to any matter which is known, is not, and should not be taken as, an acknowledgement or admission or any form of suggestion that prior publication (or information derived from it) or known matter forms part of the common general knowledge in the field of endeavour to which this specification relates.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, invention(s) have been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, for example, aspects of one embodiment may be combined with aspects of another embodiment to realize yet other embodiments. Further, each independent feature or component of any given assembly may constitute an additional embodiment.

The invention claimed is:

1. A water swellable rubber composition comprising:
   about 100 parts per hundred (PHR) of a nitrile elastomer comprising a Mooney viscosity from about 45 to about 60 at 100° C.;
   about 40 PHR of a polyethylene oxide;
   about 20 PHR of an ionic peroxide cure and/or peroxide curing with a metallic co-agent comprising an alkylated phenol, a fatty ester, and a zinc diacrylate;
   a vulcanizing agent comprising a polymeric sulfur, a rhombic sulfur, and a process oil;
   about 126 PHR of a salt; and
   about 65 PHR of a super absorbing polymer, clay and/or other natural swelling material,
   wherein the nitrile elastomer comprises a bound acrylonitrile content of about 40%.

2. The water swellable rubber composition of claim 1, wherein the salt is one or more compound selected from the group consisting of metal containing salts comprising metal chlorides, metal phosphates, metal carbonates, metal oxides, metal sulfides, metal hydroxides, metal sulfates, metal acetates, metal bicarbonates, metal formates, metal hydrosulphides, metal imides, metal nitrates, metal nitrides; dissociating salts; and non-metal salts.

3. The water swellable rubber composition of claim 1, wherein the super absorbing polymer comprises one or more of the following: poly-electrolytes, polyacrylates, polyacryamide-co-polyacrylates, polyacrylamides, acrylic acids, hydrophilic clays, bentonite, wood, cork, and/or cellulose fibers.

4. The water swellable rubber composition of claim 1 further comprising a general purpose plasticizer for rubber products selected from the group consisting of phthalate esters, trimellitates, sebacates, adipates, terephthalates, benzoates, dibenzoates, organophosphates, gluterates, and azelates.

5. The water swellable rubber composition of claim 1, further comprising carbon black.

6. The water swellable rubber composition of claim 1, further comprising zinc oxide.

7. The water swellable rubber composition of claim 1, further comprising a cement or Portland cement.

8. The water swellable rubber composition of claim 1, further comprising about 35 PHR of a cement of Portland cement.

9. The water swellable rubber composition of claim 1, further comprising silica.

10. The water swellable rubber composition of claim 1, further comprising about 30 PHR of silica.

11. The water swellable rubber composition of claim 1, further comprising about 8-12 PHR of dioctyl phthalate.

12. The water swellable rubber composition of claim 1, further comprising about 10 PHR of dioctyl phthalate.

13. The water swellable rubber composition of claim 1, further comprising about 6-10 PHR of carbon black.

14. The water swellable rubber composition of claim 1, further comprising about 8 PHR of carbon black.

15. The water swellable rubber composition of claim 1, further comprising about 3-7 PHR of zinc oxide.

16. The water swellable rubber composition of claim 1, further comprising about 5 PHR of zinc oxide.

17. The water swellable rubber composition of claim 1, further comprising stearic acid.

18. The water swellable rubber composition of claim 1, further comprising about 1 PHR of stearic acid.

\* \* \* \* \*